United States Patent
Allen et al.

(10) Patent No.: US 6,934,800 B2
(45) Date of Patent: Aug. 23, 2005

(54) METHOD AND COMPUTER FOR DATA SET SEPARATION

(75) Inventors: Stevan Charles Allen, Gilroy, CA (US); Sanjay Shyam, Los Altos, CA (US); Victor S. Liang, San Jose, CA (US); Savur Anand Rao, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 354 days.

(21) Appl. No.: 10/072,522

(22) Filed: Feb. 6, 2002

(65) Prior Publication Data

US 2003/0149835 A1 Aug. 7, 2003

(51) Int. Cl.$^7$ .............................. G06F 12/00; G06F 9/00
(52) U.S. Cl. ...................... 711/112; 711/170; 711/100; 714/100
(58) Field of Search .............................. 711/112, 170, 711/100; 714/100, 1, 2, 6

(56) References Cited

U.S. PATENT DOCUMENTS

| | | | |
|---|---|---|---|
| 4,310,883 A | 1/1982 | Clifton et al. ............... | 364/200 |
| 5,428,758 A | 6/1995 | Salsburg ...................... | 395/400 |
| 5,506,986 A | 4/1996 | Healy .......................... | 395/600 |
| 5,608,890 A | 3/1997 | Berger et al. ................ | 395/440 |
| 5,644,696 A | 7/1997 | Pearson et al. ......... | 395/182.04 |
| 5,761,503 A | 6/1998 | Fisher ......................... | 711/170 |
| 5,761,676 A | 6/1998 | Wood et al. ................. | 707/202 |
| 5,790,886 A | 8/1998 | Allen .......................... | 395/825 |
| 5,812,565 A | 9/1998 | Fendt et al. ................ | 371/40.2 |
| 6,029,178 A | 2/2000 | Martin et al. ................ | 707/201 |
| 6,065,108 A | 5/2000 | Tremblay et al. ............ | 712/201 |
| 6,115,784 A | 9/2000 | Dorricott et al. ........... | 711/102 |
| 6,189,015 B1 | 2/2001 | Reed et al. .................. | 707/201 |
| 6,453,426 B1 * | 9/2002 | Gamache et al. .............. | 714/4 |

FOREIGN PATENT DOCUMENTS

JP 10020921 1/1998

OTHER PUBLICATIONS

IBM Technical Disclosure Bulletin, "*DASD Retrieval Via Outboard Multilevel Index Scan*", p. 339–341, Jun. 1979.

* cited by examiner

*Primary Examiner*—Kimberly McLean-Mayo
(74) *Attorney, Agent, or Firm*—Bryan W. Butler, Esq.; Harrington & Smith, LLP

(57) ABSTRACT

A computer system that includes a computer and a storage system. The storage system includes a plurality of storage resources, each of which includes one or more storage volumes. Data sets are allocated among the storage volumes according to a policy of requirements and preferences based on separation of critical data sets so that a single point of failure in one storage resource will have minimal impact on data sets stored in a different resource. According to the method, a second currently stored data set to be separated from a new first data set is identified. A storage resource and any volume thereof that contains the second data set is identified. An eligible volume list for selection of a storage volume for the first data set is formed according to the policy. The storage volumes of the storage resource identified as containing the second data set are excluded from the eligible volume list. The storage volumes of the remaining storage resources are ordered according to a preference level of storage resources.

19 Claims, 3 Drawing Sheets

```
SEPARATION_POLICY                                          A1
    DATA_SET_LIST (CHECKING.ACCT, SAVINGS.ACCT)            A2
    REQUIRED_SEPARATION_LEVEL (LOGICAL_SUB_SYSTEM)         A3
    PREFERRED_SEPARATION_LEVEL (NONE)                      A4

SEPARATION_POLICY                                          B1
    DATA_SET_LIST (CHECKING.ACCT, CHECKING.BACKUP)         B2
    REQUIRED_SEPARATION_LEVEL (LOGICAL_SUB_SYSTEM)         B3
    PREFERRED_SEPARATION_LEVEL (CONTROLLER)                B4
```

METHOD AND COMPUTER FOR DATA SET SEPARATION

FIELD OF THE INVENTION

This invention relates to a method and system for allocation of storage for data sets in a manner that minimizes single points of failure and improves access performance.

BACKGROUND OF THE INVENTION

Computer systems are known to have a host computer and a storage system. Data sets associated with applications that run on the host computer are stored in the storage system. The storage system generally includes a plurality of storage devices that are controlled by a plurality of controllers that may each have one or more logical subsystems. A failure that occurs in a component, such as a controller or a logical subsystem, impacts all data sets stored therein. Such a failure, sometimes known as a single point of failure, can be problematic if all the data sets of a client are stored in the failed component. Performance of simultaneous data access may also be problematic if the accessed data is stored on the same storage component.

The known computer systems generally allocate data sets for storage in the components of the storage system. For example, U.S. Pat. No. 5,790,886 describes an automated data storage space allocation system that uses prioritized parameters, such as available space, cache, performance, size, availability, location, portability and share status. To determine available storage devices, these data set parameters are compared with storage system characteristics, such as available space, cache, performance, portability, volatility, location, cost and fragmentation. The comparison is used to establish a linked chain of available storage devices in a preference ordered sequence. However, the automated procedure of this system does not address the problem of a single point of failure impacting all data sets allocated to the device in which the failure occurs.

Thus, a need exists for an improved data set allocation that is capable of data allocation in which storage locations for a data set can be allocated so as to separate the data set from other data sets.

SUMMARY OF THE INVENTION

The method and computer of the present invention allocates data sets among storage volumes of a storage system according to requirements and/or preferences that separate critical data sets from one another so as to minimize the impact of a single point of failure that occurs in one part of the storage system. The method allocates a first data set by identifying at least one second data set from which the first data set is to be separated. Any of the storage resources of the storage system that contains a storage volume that stores the second data set are also identified. An eligible volume list is formed according to a policy for selection of a storage volume for the first data set. Any storage volume of the storage resource identified as containing the second data set is excluded from the eligible volume list. This assures that a failure in either a storage resource that is selected for the first data set or the storage resource that contains the second data set has a minimal impact on the other thereof.

According to one aspect of the method of the present invention, the remainder of the storage volumes of the resources of the storage system are ordered according to the policy to prefer those that meet a preferred separation level ahead of those that do not meet the preferred separation level.

BRIEF DESCRIPTION OF THE DRAWINGS

Other and further objects, advantages and features of the present invention will be understood by reference to the following specification in conjunction with the accompanying drawings, in which like reference characters denote like elements of structure and.

DESCRIPTION OF THE PREFERRED EMBODIMENT

Figure 1:
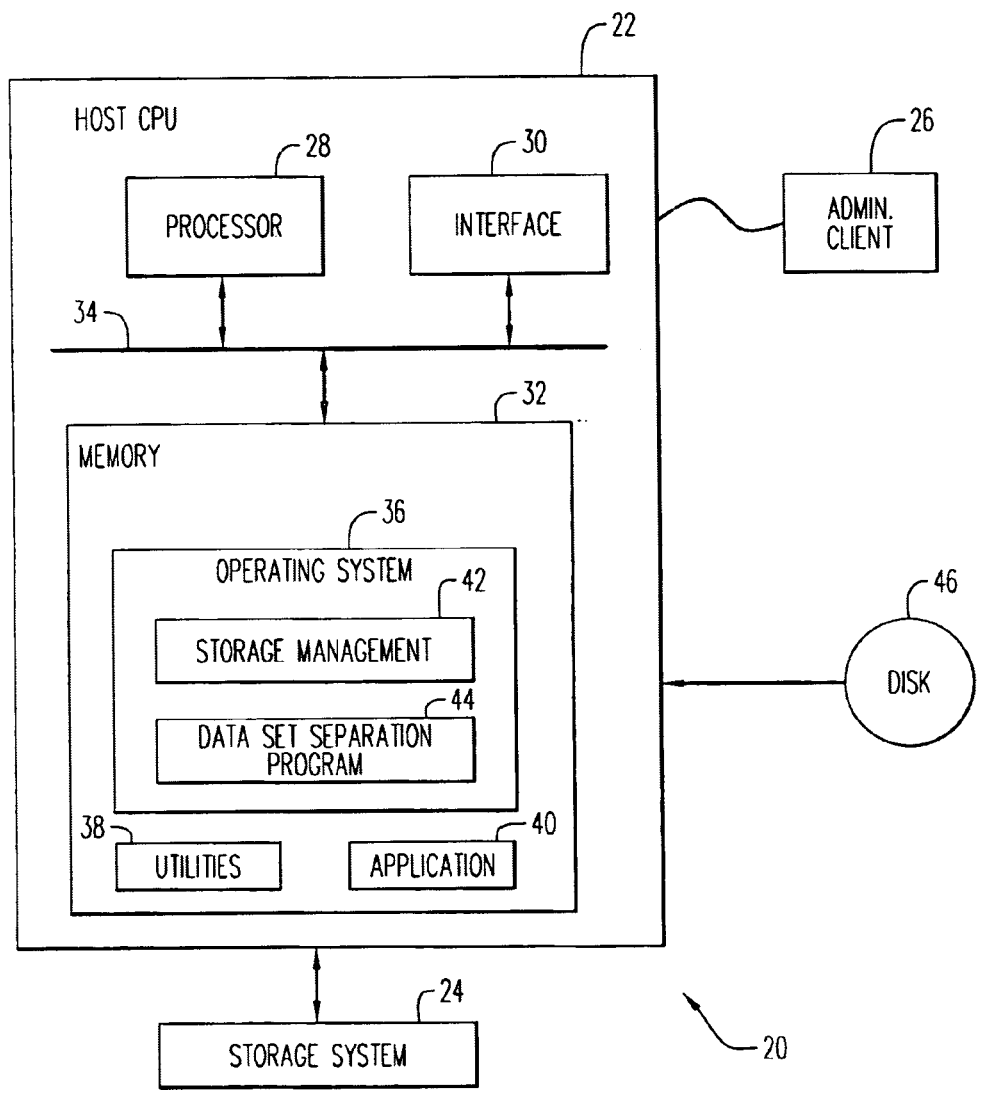
FIG. 1 is a block diagram of a computer system of the present invention.

Referring to FIG. 1, a data processing system 20 includes a host computer 22, a storage system 24 and an administrative client 26. Host computer 22 includes a processor 28, an interface 30, a memory 32 and a bus 34. Bus 34 interconnects processor 28, interface 30 and memory 32. Memory 32 includes an operating system 36, a utilities program 38 and an application program 40. Operating system 36 includes a storage management program 42 and a data set separation program 44. Storage management system 42 may be any suitable system that manages storage of data sets in a data processing system, such as the Storage Management Subsystem (SMS) of the IBM® Corporation. Data set separation program 44 according to the present invention provides the capability of allocating different data sets to different storage components so as to minimize the impact of a failure in one of the components, such as a controller or a logical subsystem thereof.

Storage system 24 may comprise any suitable storage system, such as disk drives, semiconductor memory, optical memory, and the like. For example, storage system 24 may comprise a plurality of storage disks with one or more controllers that communicate with host computer via interface 30. The controller may have one or more logical subsystems that each have one or more storage volumes.

Administrative client 26 is any suitable input device that is capable of operation by an administrative person (administrator) who inputs processing rules into host computer 22 for use by operating system 36, utilities 38 and application program 40.

Data processing system 20 is capable of being interconnected with a memory media, such as a disk, 46 that contains the software code for operating system 36, utilities 38 and application 40. That is, the software contained on memory media 46 can be loaded into memory 32.

Operating system 36 is operable to cause processor 28 to execute application 40. Storage management 42 is operable to allocate logical storage volumes for use by applications, such as application 42. Data set separation program 44 is operable to permit data set separation allocation as an extension to storage management system 42 or as a separate program entity.

The administrator using administrator client 26 supplies one or more policy rules that are used by storage management program 42 to allocate storage volumes of storage system 24 among a plurality of data sets. Data set separation program 44 permits the administrator to extend storage allocation to allocate storage volumes to a data set based on a data set separation policy.

Figures 2, 4:
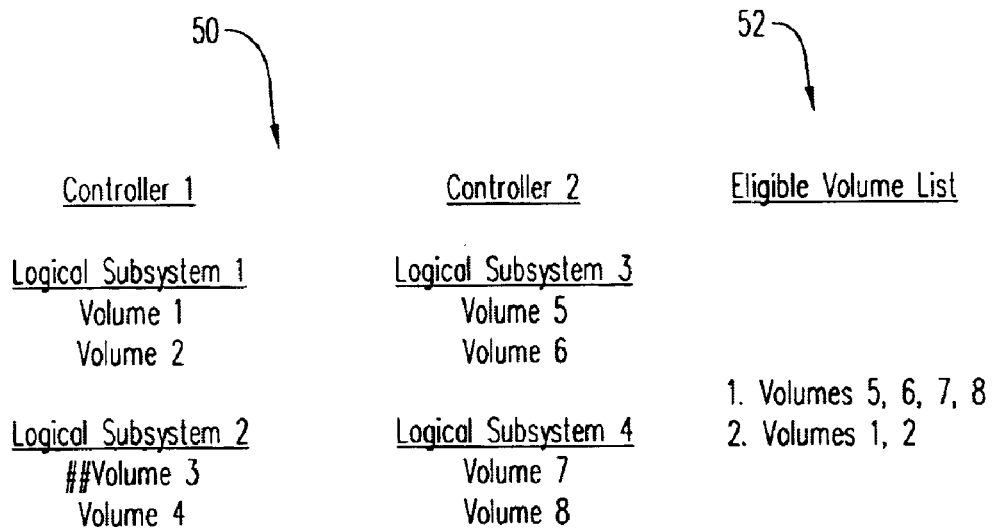
FIG. 2 depicts storage allocations for the computer system of FIG. 1.
FIG. 4 depicts exemplary separation policies.

Referring to FIG. 2, an exemplary hierarchy 50 is shown for storage system 24. Hierarchy 50 includes two controllers, designated as controller 1 and controller 2. Controller 1 includes two logical subsystems, designated as logical subsystem 1 and logical subsystem 2. Logical subsystem 1 includes two storage volumes, designated as volume 1 and volume 2. Logical subsystem 2 includes two storage volumes, designated as volume 3 and volume 4. Controller 2 includes two logical subsystems, designated as logical subsystem 3 and logical subsystem 4. Logical subsystem 3 includes two storage volumes, designated as volume 5 and volume 6. Logical subsystem 4 includes two storage volumes, designated as volume 7 and volume 8. It will be apparent to those skilled in the art that hierarchy 50 may include more or less than two controllers with each having more or less than two logical subsystems that each have more or less than two storage volumes.

Controllers 1 and 2, logical subsystems 1–4 and the storage volumes thereof are sometimes referred to herein generically as storage resources. For example, a storage resource can be controller 1, logical subsystem 1 or logical subsystem 2. Each storage resource includes one or more storage volumes. For example, controller 1 includes volumes 1–4 and logical subsystem 1 includes volume 1 and volume 2. In a broader sense, shared resources for which the data separation method and computer of the present invention apply may include any appropriate units, such as drive read/write heads, volumes, logical units (LUNs) controllers, logical subsystems, physical control units, data channels and paths, data directors and switches, host systems and the like.

Data that is to be assigned for storage in a particular storage resource may be any form of data, such as a data set, record, field, object, data types, meta data, table, database, logs, files, file system and the like. The term "data set" is used herein in a generic sense to mean any of the data forms.

Data set separation program 44 affords the capability for the administrator to separate data sets among separate storage resources. This provides the advantages of minimizing contention for resources and minimizing impact of single points of failure. For example, the administrator can separate mission critical data sets from one another so as to minimize the impact of failure of a storage component.

Referring to FIGS. 2 and 4, two data separation policies A1 and B1 are provided as input to data set separation program 44. Separation policy A1 lists two data sets CHECKING.ACCT and SAVINGS.ACCT A2 that require a separation A3 from each other on the logical subsystem 1 level. The term level represents a hierarchy of storage resources 50 where a given storage resource, such as logical subsystem 1, may have a plurality of sub level storage resources, such as volumes 1 and 2. Separation policy B1 lists two data sets CHECKING.ACCT and CHECKING.BACKUP B2, which require a separation B3 from each other on the logical subsystem 1 level and prefers a separation on the controller 1 level.

A separation policy may specify two or more data sets, which are to be separated. A data set may be specified in one or more separation policies, such as the CHECKING.ACCT data set, which is listed in separation policies A1 and B1. Utilizing multiple separation policies in this example allows SAVINGS.ACCT data A2 to be placed on the same storage resource as CHECKING.ACCT data B2.

Data sets that are to be listed in separation policies may be manually decided by the storage administrator or dynamically generated by the operating system 36, utilities 38 or application program 40 based on data attributes or historical information. How the separation policy is created is not a part of the present invention.

Data set separation program 44 identifies data sets that are to be separated from one another. For example, a new data set is to be separated from one or more currently stored data sets. Referring again to FIG. 2, program 44 identifies shared storage resources within hierarchy 50. For example, volumes 1 and 2 share logical subsystem 1, volumes 3 and 4 share logical subsystem 2 and logical subsystems 1 and 2 share controller 1. Program 44 identifies the storage location of a currently stored data as volume 3. This is indicated by the symbol "##" in FIG. 2.

Data set separation program 44 then maps required and preferred levels of separation to the storage resources. The separation levels may be provided by the administrator. For example, the administrator identifies logical subsystem as a required separation level and controller as a preferred separation level. The mapping operation rejects or excludes any storage resource that does not meet the required separation level. In the example, storage volume 3 resides in logical subsystem 2. Therefore, logical subsystem 2 and its storage volumes 3 and 4 are excluded from the allocation consideration. The remaining storage resources, volumes 1 and 2 and volumes 5–8, are then ranked in an eligible volume list 52 so as to prefer volumes that meet the preferred separation level ahead of those that do not.

Volumes 5–8 meet the preferred separation level (controller) and volumes 1 and 2 do not. Thus, volumes 5–8 have the highest ranking, designated by the numeral 1, and volumes 1 and 2 have a lower ranking, designated by the numeral 2.

The allocation procedure then attempts to place the new data set on volumes 5–8. If unsuccessful, allocation is then attempted on volumes 1 and 2. If unsuccessful, the allocation by data set separation fails for lack of ability to separate based on the set criterion and allocation is by storage management program 42 continues as if there were no separation criterion.

Figure 3:
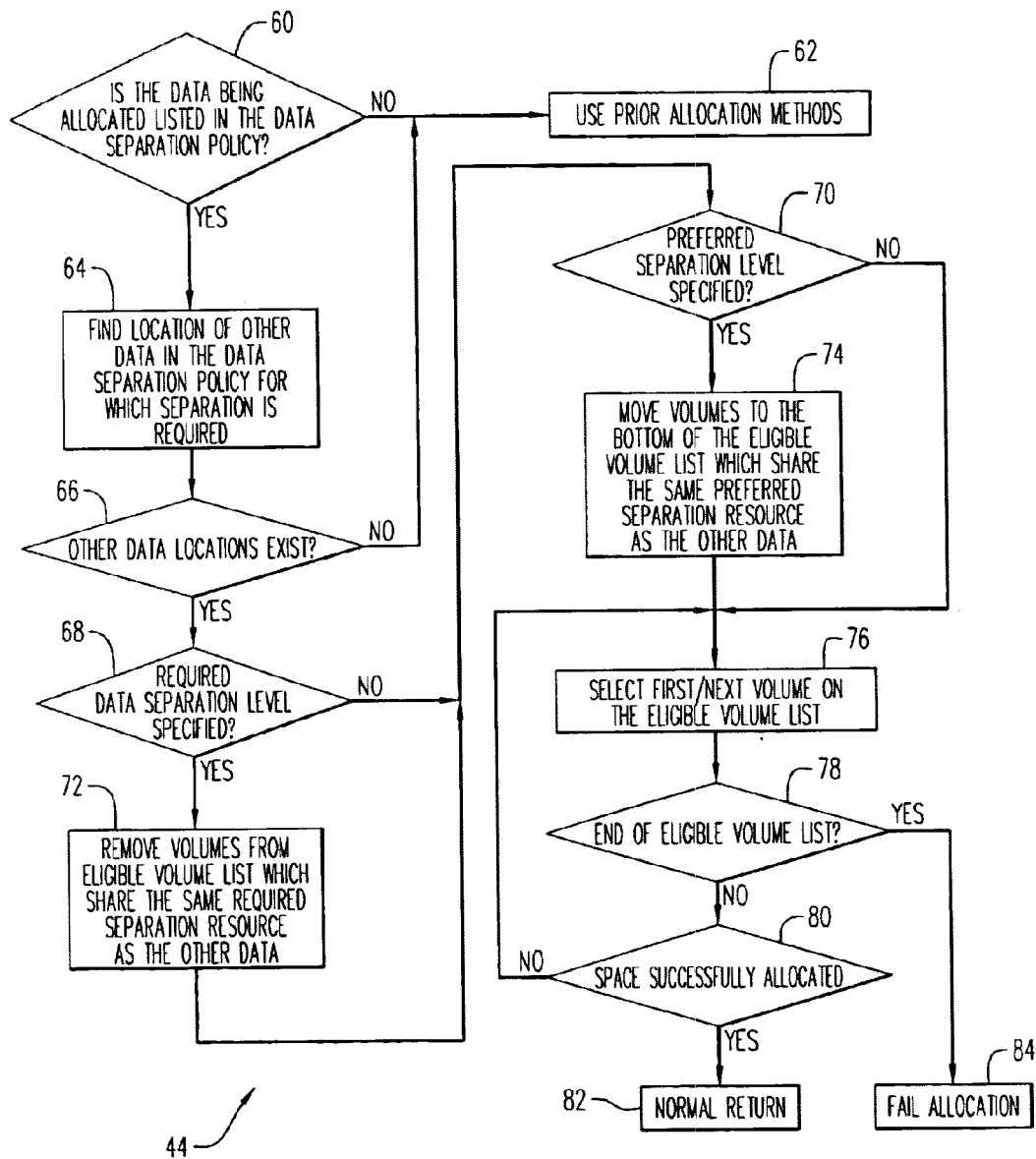
FIG. 3 is a flow diagram of the data separation program of the FIG. 1 computer system.

Referring to FIG. 3, data set separation program 44 determines at step 60 if the data being allocated is listed in a data separation policy, which for example is provided by the administrator. If not, allocation of data by storage management program 42 is attempted at step 62. That is, storage management program 42 will allocate data for storage according to its policy rules. If step 60 determines that the data being allocated is listed in the policy, step 64 finds the storage location of the currently stored data from which separation is required. Step 66 determines if other data locations exist. If not, step 62 is performed. If so, step 68 determines if there is a required level of separation. If not, step 70 is performed to determine if there is a preferred level of separation. If step 68 determines that there is a required separation level, the volumes of the shared resource level are removed or excluded from eligible volume list 52. In the example of FIG. 2, the currently stored data is in volume 3. The shared resource is logical subsystem 2. The shared volumes 3 and 4 are excluded.

At step 70, it is determined if a preferred data separation level is specified. If not, step 76 selects the next eligible volume on eligible volume list 52. For example, there is no preferred separation level and all volumes, except for those excluded by step 72, are unranked for the data separation allocation. If step 70 determines that there is a preferred data separation level, at step 74 the volumes that share the same resource are moved to the bottom of eligible volume list 52. In the example of FIG. 2, volumes 1 and 2 share controller 1 with volume 3 and are moved to the bottom (rank 2) of eligible volume list 52.

At step 76, the next eligible volume on eligible volume list 52 is selected. Step 78 determines if the end of eligible volume list 52 is reached. If not, step 80 determines if space is successfully allocated to the selected volume. If so, a normal return is performed at step 82. If not (e.g., the selected volume has no free space), step 76 is repeated until step 80 determines that space is successfully allocated or step 78 determines that the eligible volumes have been exhausted. That is, all eligible volumes have already been considered and are unavailable. This results in a failed allocation by data set separation at step 84 with an abnormal return to storage management program 42.

The present invention having been thus described with particular reference to the preferred forms thereof, it will be obvious that various changes and modifications may be made therein without departing from the spirit and scope of the present invention as defined in the appended claims.

What is claimed is:

1. A method for allocating a first data set to a first storage volume of a storage system, wherein said storage system includes a plurality of storage resources that each contain one or more storage volumes, said method comprising:

(a) identifying at least one second data set from which said first data set is to be separated;

(b) identifying any of said plurality of storage resources and any volume thereof that contains said second data set; and (c) forming an eligible volume list for selection of said first storage resource according to a policy such that any storage volume identified by step (b) is excluded from said list, whereby a failure in a storage resource that contains said first storage volume or any storage resource identified by step (b) has a minimal impact on the other thereof, wherein the remainder of said storage volumes are ordered according to said policy to prefer those that meet a preferred separation level ahead of those that do not meet said preferred separation level.

2. The method of claim 1, wherein said plurality of storage resources include first and second storage resources, said first storage resource is a subsystem of said second storage resource and said preference level includes at least said second storage resource, wherein step (b) identifies said first storage resource as containing said second data set, and wherein step (c) forms said eligible volume list by omitting the storage volumes of said first storage resource from said list and placing any other storage volumes contained in said second storage resource behind any storage volumes of others of said plurality of storage resources in said eligible volume list.

3. The method of claim 1, wherein step (c) forms said eligible volume list by identifying a group of said plurality of storage resources that are available for allocation to said first data set and by eliminating from said group any of said storage resources identified by step (b).

4. The method of claim 1, further comprising (d) selecting said first storage volume from said eligible volume list.

5. A computer that allocates a first data set to a first storage volume of a storage system, wherein said storage system includes a plurality of storage resources that each contain one or more storage volumes, said computer comprising:

first means for identifying at least one second data set from which said first data set is to be separated;

second means for identifying any of said plurality of storage resources and any volume thereof that contains said second data set; and third means for forming an eligible volume list for selection of said first storage resource according to a policy such that any storage volume identified by said second means is excluded from said list, whereby a failure in either a storage resource that contains said first storage volume or any storage resource identified by said second means has a minimal impact on the other thereof, where a remainder of said storage volumes are ordered according to said policy to prefer those that meet a preferred separation level ahead of those that do not meet said preferred separation level.

6. A memory media for causing a computer to allocate a first data set to a first storage volume of a storage system, wherein said storage system includes a plurality of storage resources that each contain one or more storage volumes, said memory media comprising:

first means for controlling said computer to perform a first operation of identifying at least one second data set from which said first data set is to be separated;

second means for controlling said computer to perform a second operation of identifying any of said plurality of storage resources and any volume thereof that contains said second data set; and third means for controlling said computer to perform a third operation of forming an eligible volume list for selection of said first storage resource according to a policy such that any storage volume identified by said second operation is excluded from said list, whereby a failure in either a storage resource that contains said first storage volume or any storage resource identified by said second operation has a minimal impact on the other thereof, where a remainder of said storage volumes are ordered according to said policy to prefer those that meet a preferred separation level ahead of those that do not meet said preferred separation level.

7. A computer that allocates a first data set to a first storage volume of a storage system, wherein said storage system includes a plurality of storage resources that each contain at least one storage volume, said computer comprising:

first means for identifying at least one second data set from which said first data set is to be separated;

second means for identifying any of said plurality of storage resources and any volume thereof that contains said second data set; and third means for forming an eligible volume list for selection of said first storage resource according to a policy such that any storage volume identified by said second means is excluded from said list, wherein a remainder of said storage volumes that are not excluded from the list are ordered according to said policy to prefer those that meet a preferred separation level ahead of those that do not meet said preferred separation level.

8. A computer as in claim 7, where said plurality of storage resources comprise a first storage resource and a second storage resource, where said first storage resource is a subsystem of said second storage resource and said preference level includes at least said second storage resource, where said second means identifies said first storage resource as containing said second data set, and where said third means forms said eligible volume list by omitting the storage volumes of said first storage resource from said list and placing any other storage volumes contained in said second storage resource behind any storage volumes of others of said plurality of storage resources in said eligible volume list.

9. A computer as in claim 7, where said third means forms said eligible volume list by identifying a group of said plurality of storage resources that are available for allocation to said first data set, and by eliminating from said group any of said storage resources identified by said second means.

10. A computer as in claim 7, further comprising means for selecting said first storage volume from said eligible volume list.

11. A memory media for causing a computer to allocate a first data set to a first storage volume of a storage system, wherein said storage system includes a plurality of storage resources that each comprise at least one storage volume, said memory media comprising computer program instructions to perform operations of:
- identifying at least one second data set from which said first data set is to be separated;
- identifying any of said plurality of storage resources and any volume thereof that contains said second data set;
- forming an eligible volume list for selection of said first storage resource according to a policy such that any storage volume identified by said second operation is excluded from said list; and
- ordering the remainder of said storage volumes that are not excluded form the list according to said policy to prefer those that meet a preferred separation level ahead of those that do not meet said preferred separation level.

12. A memory media as in claim 11, where said plurality of storage resources comprise a first storage resource and a second storage resource, where said first storage resource is a subsystem of said second storage resource and said preference level includes at least said second storage resource, where identifying any of said plurality of storage resources identifies said first storage resource as containing said second data set, and where the operation of forming forms said eligible volume list by omitting the storage volumes of said first storage resource from said list and placing any other storage volumes contained in said second storage resource behind any storage volumes of others of said plurality of storage resources in said eligible volume list.

13. A memory media as in claim 11, where the operation of forming forms said eligible volume list by identifying a group of said plurality of storage resources that are available for allocation to said first data set, and by eliminating from said group any of said storage resources identified by said second means.

14. A memory media as in claim 11, where said computer program instructions further perform an operation of selecting said first storage volume from said eligible volume list.

15. A data processing system comprising a host computer coupled to a storage system comprising storage resources, said host computer comprising a data set separator and a storage system manager, where said data set separator uses a separation policy to identify at least one second data set from which a first data set is to be separated and cooperates with said storage system manager to identify any portion of said storage resources that contains said second data set to form a list of eligible portions of said storage resources in which to store said first data set such that any portion of said storage resources identified as containing said second data set is excluded from the list, and where any non-excluded portions of said storage resources are ordered so as to prefer those that meet a preferred separation level ahead of those that do not meet the preferred separation level.

16. A data processing system as in claim 15, where said storage resources comprise a first storage resource and a second storage resource, where said first storage resource is a subsystem of said second storage resource and a preference level includes at least said second storage resource, where said data set separator identifies said first storage resource as containing said second data set forms said list by omitting storage volumes of said first storage resource from the list and placing any other storage volumes contained in said second storage resource behind any storage volumes of others of said plurality of storage resources in the list.

17. A data processing system as in claim 15, where the preferred separation level corresponds to a hierarchical level of said storage system.

18. A data processing system as in claim 17, where the preferred separation level corresponds to a controller level.

19. A data processing system as in claim 17, where the preferred separation level corresponds to a logical subsystem level.

* * * * *